Jan. 31, 1950

N. A. CHRISTENSEN 2,496,036

REVERSING VALVE

Filed Aug. 21, 1944

2 Sheets-Sheet 1

INVENTOR.
NIELS A. CHRISTENSEN
BY
Bates, Teare, & McBean
ATTORNEYS

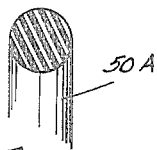
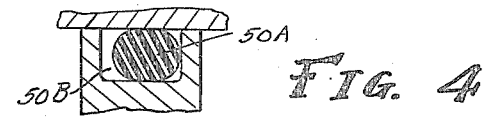
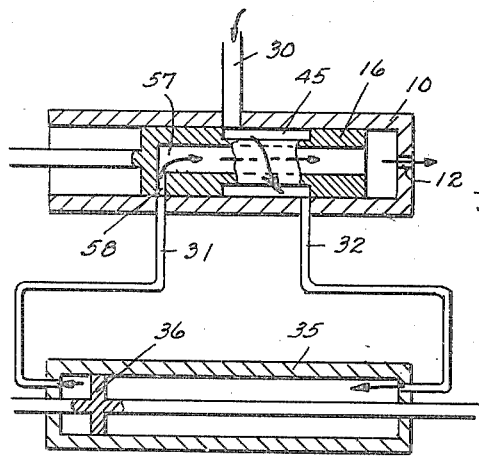
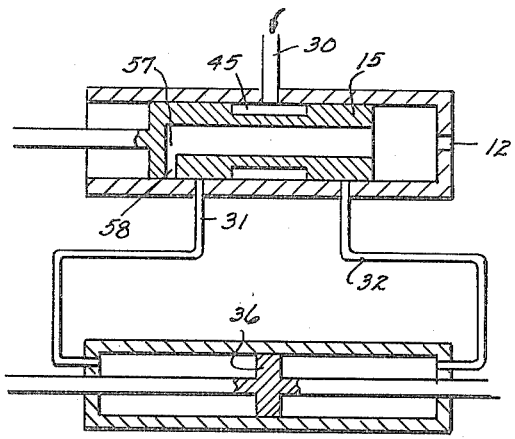
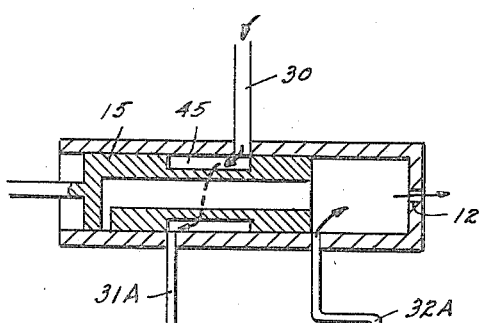
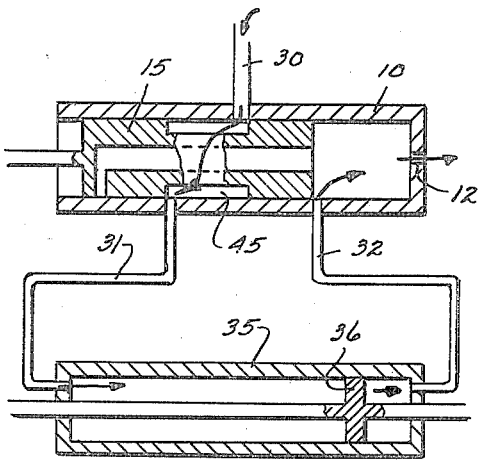
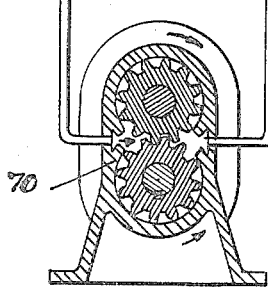

Patented Jan. 31, 1950

2,496,036

UNITED STATES PATENT OFFICE 2,496,036

REVERSING VALVE

Niels A. Christensen, South Euclid, Ohio

Application August 21, 1944, Serial No. 550,368

1 Claim. (Cl. 251—76)

This invention relates to valve structures and particularly to a device that is adaptable for use as a reversing valve for directing the flow of fluid to a working cylinder or to any device in which fluid under pressure is adapted to be used.

There is a great demand at the present time, particularly in aircraft construction, for a reversing valve that will operate satisfactorily without leakage to direct the flow of fluid so as to control the operation of the working device, such as a cylinder or motor located at a remote point. In aircraft manufacture, it is desirable to mount in the cockpit, within reach of the pilot, a valve for controlling the flow of fluid to a working device that is located, for example, in the region of the landing gear, the ailerons, the rudders, bomb doors, variable pitch propeller and other devices of the modern airship requiring precision and positive control. The difficulty of assuring satisfactory operation of the valve mechanism, however, without danger of leakage, and with a minimum degree of effort by the operator is essential, not only in aircraft operation, but also in the operation of hydraulic equipment where the operating device is remotely located from the point of control.

An object of the present invention is to provide a valve mechanism which will be simple in construction and yet will operate satisfactory to resist leakage under high pressure without necessitating an expensive construction, and which will be positive in operation and yet permit flexibility in the control of the fluid that is used for operating a working device.

Figure 1:
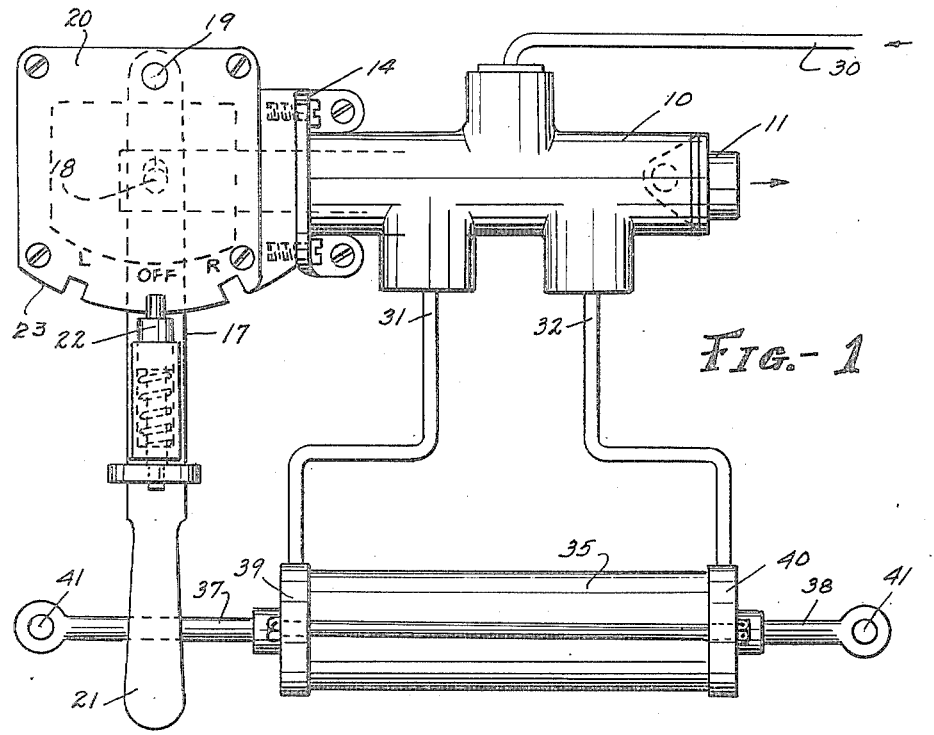
Figure 2:
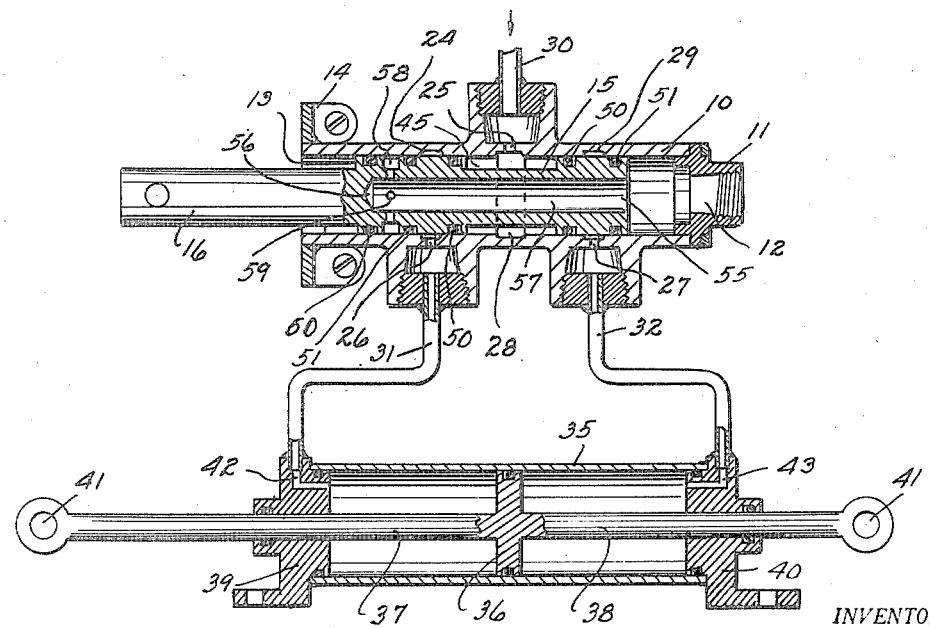

My invention is shown in the drawings, wherein Fig. 1 is a side view of a valve assembly embodying one type of working device; Fig. 2 is a vertical section taken through the structure of Fig. 1; Fig. 3 is a sectional view through a packing ring that is used with the valve mechanism; Fig. 4 is a sectional view showing the packing ring assembled in a piston groove; Fig. 5 is a diagrammatic view showing the valve in "off" position; Fig. 6 is a diagrammatic view showing the valve in one working position; Fig. 7 is a diagrammatic view illustrating the valve in a different working position, and Fig. 8 is a sectional view diagrammatically illustrating the use of the valve in connection with a fluid motor.

My invention includes a valve device having a cylinder 10, one end of which has a head 11 which has an aperture 12 extending therethrough and adapted to receive a conduit for connecting fluid from the cylinder, and the other end 13 of which is open to the atmosphere and is provided with a bracket 14 for attachment to any suitable support. A multi-piston member 15 is slidably mounted within the cylinder and has a rod 16 projecting from one end thereof and adapted for attachment to an operating lever 17 by a pin and slot connection 18. The lever is shown as being pivotally connected at 19 to a housing 20 that is attached to the support in close proximity to the open end of the cylinder, and the free end of the lever terminates in a handle 21 by means of which it may be oscillated about the axis of the pivot 19 for reciprocating the piston within the cylinder. A spring pressed plunger 22 carried by the lever is adapted to engage suitable notches, designated "L," "Off," and "R," in the cover plate 23 of the housing for holding the lever and, therefore, the associated piston in a predetermined position.

The cylinder is shown as having ports 25, 26, and 27 at spaced points in the wall thereof, and is illustrated as having an annular groove 28 adjacent the port 25 and also as having provision for attaching conduits 30, 31 and 32 for communication with ports 25, 26, and 27, respectively. Other annular grooves 24 and 29 are disposed in the cylinder in communication with the ports 26 and 27 respectively.

In the assembly of Figs. 1 and 2, the conduit 30 serves to supply fluid under pressure to the cylinder, while conduits 31 and 32 establish communication between the valve and a working device. Such device is illustrated as a cylinder 35 which has a piston 36 therein and rods 37 and 38 which project through heads 39 and 40 respectively on opposite ends of the cylinder. The heads may be held in position on the cylinder by means of the rods 33, and the cylinder may be anchored against movement with respect to the cylinder 10 in any convenient way. Any suitable device desired to be actuated may be attached to one or both piston rods 37 or 38, and for such purpose, each rod is shown as having an eye 41 by means of which the desired connection can be made. Communication between the cylinder 35 and the respective conduits 31 and 32 may be obtained through passageways 42 and 43 in the heads 39 and 40, respectively.

The present invention is intended to direct the flow of fluid from the conduit 30 into the conduit 31 or 32 as desired, and simultaneously to effect a discharge of fluid from the working cylinder 35. This is accomplished by providing an elongated annular groove 45 in the intermediate portion of the member 15, the groove having such length that it uncovers either the port 26 or 27, while in communication with the port 25, so as to direct the flow of fluid through either port 26 or 27, depending upon the position of the member 15 with reference to its associated cylinder. In the position of the parts shown in Fig. 2, the piston is in the "off" position illustrated diagrammatically in Fig. 5, wherein the flow of fluid is prevented into the ports 26 or 27 by the packing rings 50, and wherein the passage of fluid from either conduit 31 or 32 along the piston to the discharge port 12 therein is prevented by packing rings 51. The rings 50 and 51, at each end of the groove 45, are spaced apart sufficiently to bridge the ports 26 and 27, respectively, when the piston is in the "off" position.

The discharge from the working cylinder through the valve cylinder 10 is accomplished by making the piston hollow from the end 55 thereof to a point 56 adjacent the opposite end and by establishing communication between the hollow part 57 and a groove 58 by means of radially extending passageways 59. Leakage from the groove 58 is sealed by means of a packing ring 60. The groove in turn operates to permit the discharge of fluid from the conduit 31 into the hollow portion of the piston whenever the piston is in such position that the groove 58 is in registration with the port 26, as is shown for example diagrammatically in Fig. 6. Discharge of fluid from the passageway 32 is permitted whenever the piston is moved sufficiently far to the left of Fig. 2 to uncover the port 27 as is shown diagrammatically in Fig. 7.

To effect a fluid tight seal, the present invention utilizes a packing ring, designated at 50A in Fig. 3 and which normally is circular in shape and is circular in cross-section. The groove in which the ring is adapted to be seated is indicated at 50B in Fig. 4 as having a depth sufficient to cause the ring to assume an elliptical shape when the piston containing it is inserted within the cylinder and to have a length greater than the longest dimension of the compressed ring whereby the ring is permitted to move slightly with respect to the piston whenever the piston is reciprocated in the cylinder. Such slight movement is sufficient to knead the packing material and keep it in satisfactory working condition. The same type of packing is shown in the working cylinder on the piston 36 and on the heads 39 and 40, respectively.

The three available positions indicated in Fig. 1 for the operating lever 17 designate the "left hand," the "off" and the "right hand" position corresponding to the valve settings indicated in Figs. 7, 5, and 6, respectively. Thus, when the lever is swung to the left, with the index plunger occupying the notch indicated "L," the valve member 15 will be moved to the left of the diagram indicated in Fig. 7 at which time fluid under pressure will flow in the direction of the arrows from the inlet conduit 30 around the piston groove 45 into the conduit 31 and thence into the cylinder 35. In such position, the piston uncovers the port leading to the conduit 32, hence, while fluid under pressure is moving the working piston 36 to the right, fluid is being forced from the cylinder 35 through the conduit 32 into the cylinder 10 and outwardly therefrom through the port 12 to a reservoir from which it can again be pumped to the piston.

When the lever 17 is moved to the "off" position of Fig. 1, the piston 15 occupies the position of Fig. 5, wherein the ports leading to the conduits 31 and 32 are closed, so that the working piston 36 is locked in any desired position.

When the lever 17 is moved to the right in Fig. 1 sufficiently to have the indexing plunger 22 thereof enter the notch designated R, the piston 15 occupies the position shown in Fig. 6, wherein fluid under pressure enters through conduit 30, passes around groove 45 and enters conduit 32 as shown by the arrows. Simultaneously with the establishment of communication between groove 45 and the conduit 32, communication is also established between the conduit 31 and the groove 58, whereby fluid in the conduit 31 can be discharged through the hollow passageway 57 into the cylinder 10 and outwardly therefrom through the port 12, whereby the working piston 36 is forced to the left in Fig. 6.

The modification of Fig. 8 shows the conduits 31A and 32A connected to a hydraulic motor indicated in general at 70, the construction of which is well-known in the art, and, therefore, need not be described in this application. It is sufficient only to state that the working device, whether in the form of a piston or a hydraulic motor can be actuated either in a forward or reverse direction merely by sliding the piston 15 within the cylinder 10 under the control of a hand lever that can be readily actuated and held in any desired selected position.

An advantage of the present invention is the fact that remote control of a fluid actuated working device can be obtained in a simple and expeditious manner without resulting in leakage of the valve mechanism. The invention thereby permits the use of relatively small compact structures that are adapted to be located in close proximity to an operator for accomplishing the operation of devices that are actuated by fluid under pressure at points remote from the position of the operator and enables the controlled devices to be quickly operated, either in a forward or reverse direction, or to be stopped at any intermediate position as may selectively be desired. Additionally, the mechanism operates without imparting a jolt to any of the mechanism, notwithstanding the fact that the manually controlled operating lever can be quickly swung from one position to another.

I claim:

A reversing valve comprising a cylinder having one end thereof open and having a discharge port at the opposite end thereof and having at the side a supply and two delivery ports, the supply port being intermediate the delivery ports, a hollow piston slidably mounted in the cylinder having one end open in communication with said discharge port and the other end closed adjacent the open end of the cylinder, said piston having three lands thereon, two of the lands being adapted to be disposed opposite the respective delivery ports and a third land being disposed adjacent the open end of the cylinder when the valve is in closed position, said third land having at least one sealing ring thereon and each of the other lands having at least two spaced sealing rings thereon, said piston having a peripheral groove between the first and second lands, said groove being operable to establish communication between the supply port and either of the delivery ports to the exclusion of the other delivery port, a passageway through the wall of the piston between the sealing ring on the third land and the adjacent sealing ring on the second land, said passageway in a predetermined position of the piston being adapted to connect one of the delivery ports with the interior of the piston.

NIELS A. CHRISTENSEN.

REFERENCES CITED

The following references are of record in the file of this patent:

UNITED STATES PATENTS

| Number | Name | Date |
|---|---|---|
| 861,805 | Camp | July 30, 1907 |
| 1,707,692 | Terbeest | Apr. 2, 1929 |
| 1,925,109 | Olson | Sept. 5, 1933 |
| 2,115,383 | Christensen | Apr. 26, 1938 |
| 2,342,763 | Smith | Feb. 29, 1944 |
| 2,394,364 | Christensen | Feb. 5, 1946 |
| 2,396,643 | DeGanahl | Mar. 19, 1946 |

FOREIGN PATENTS

| Number | Country | Date |
|---|---|---|
| 207,983 | Germany | of 1909 |